March 21, 1933. C. KADLEC 1,902,704
TUFTING MECHANISM
Filed Dec. 2, 1931 9 Sheets-Sheet 9

Inventor:
Charles Kadlec
by Samuel W. Banning, Atty

Patented Mar. 21, 1933

1,902,704

UNITED STATES PATENT OFFICE

CHARLES KADLEC, OF OSHKOSH, WISCONSIN, ASSIGNOR TO WAITE CARPET COMPANY, OF OSHKOSH, WISCONSIN, A CORPORATION OF WISCONSIN

TUFTING MECHANISM

Application filed December 2, 1931. Serial No. 578,425.

This invention relates to tufting mechanism adapted to be incorporated into a sewing machine for the purpose of drawing out the threads in a series of loops and cutting the same to form tufts, so that the resulting product will exhibit the characteristics of a tufted rug.

The present invention is designed to utilize a stationary looper and cutter which may be associated either with a straight line reciprocatory needle, or with a needle which has the reciprocating movement combined with an oscillatory movement of varying extent; and the primary object of the invention is to provide adequate means for successively introducing loops of threads from the needle to the stationary looper in such a way as to prevent the displacement of the loops from the looper during the upward recession of the needle, so that it will not be necessary to rely upon the oscillatory movements, if any, of the needle in securing the result indicated.

In my co-pending application, Serial No. 401,021, filed October 21, 1929, I have disclosed the use of a stationary looper and cutter in association with an oscillatory needle, but in that instance the oscillations of the needles must be of sufficient amplitude in each instance to carry the loops over the free tip of the looper, and while this method of operation is effective in cases where the type of sewing machine employed provides for such oscillatory movement, it is not adapted for use in connection with sewing machines which do not afford the necessary degree of oscillation.

The present invention, therefore, provides mechanical means for transporting and delivering the loop from the needle over the tip of the looper and thus compensates for the lack of oscillatory movement in the needle, although the present invention in one of the forms shown is designed to supplement the action of an oscillatory needle in the delivery of the loops.

The present invention is thus one which is readily adaptable for use in connection with sewing machines of various standard types, and at the same time secures the advantages attendant the employment of a combined stationary looper and cutter.

Further objects and details will appear from a description of the invention, in conjunction with the accompanying drawings, wherein,—

Figure 1:
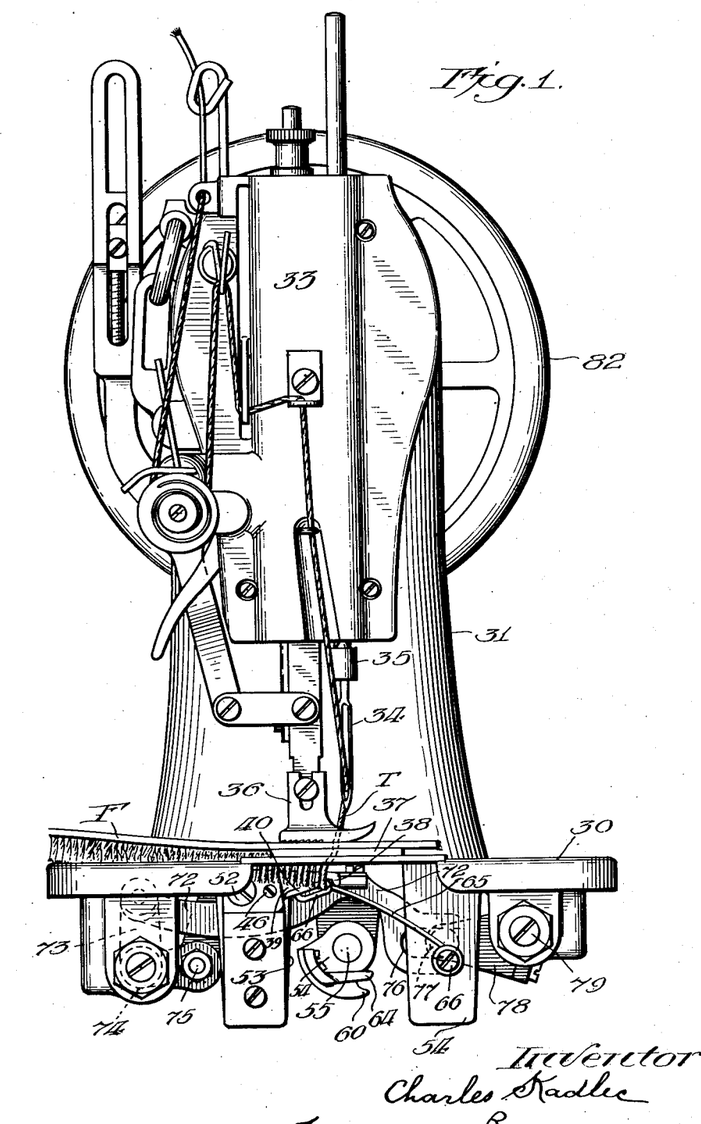
Figure 1 is a front elevation of a sewing machine showing the present invention in association with a non-oscillatory needle.
Figure 2:
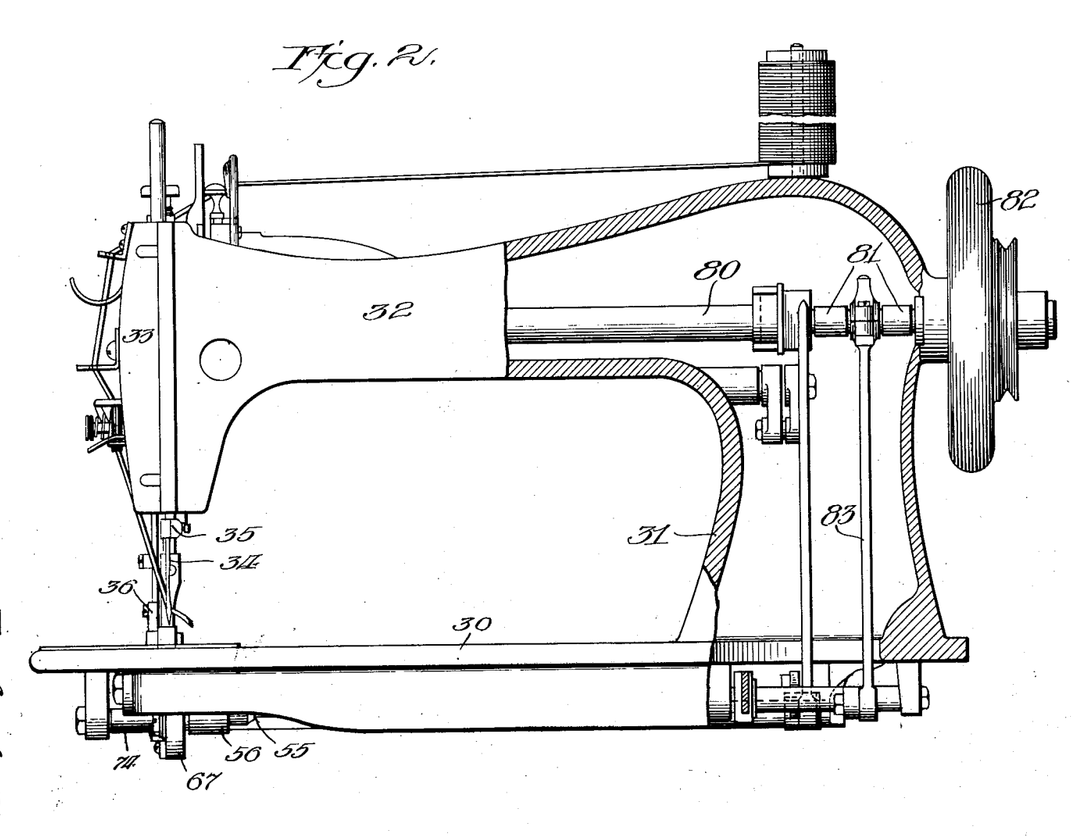
Fig. 2 is a side elevation showing the rear portion of the machine frame in section, to reveal the power transmission mechanism.

Referring first to the mechanism employing the non-oscillatory needle, the same includes a sewing machine frame comprising a table or platform 30 provided at its rear end with a standard 31, from which extends an arm 32 terminating in a head 33, which houses the mechanism for reciprocating the needle and fabric feeding mechanism, but since this portion of the mechanism is simply that of a standard sewing machine of any well known type, it is not deemed necessary to describe these mechanisms in detail.

The needle 34 is carried by a reciprocatory stem 35 and coacts with a presser foot 36 of well known type in the feeding forward of the fabric F.

In view of the fact that the tufts are formed on the under side of the fabric, and constitute a pile surface of considerable depth, it is desirable to elevate the fabric during the stitching operation, and for this purpose a plate 37 is provided above the platform 30.

Figure 17:
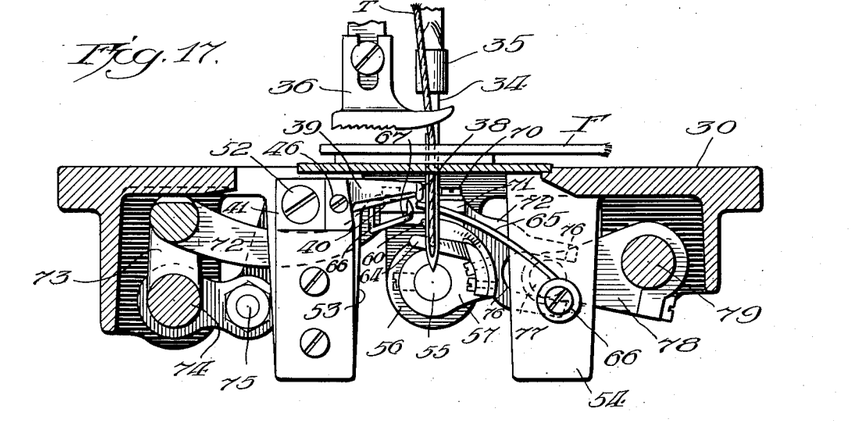
Figs. 17, 18 and 19 are front elevations of the looping and cutting mechanisms in progressive positions of adjustment.

The needle 34 carries a yarn or thread T, and on its downward movement, as best illustrated in Fig. 17, presents the inner turn of the thread in line with the tip 38 of the stationary looper 39, which carries the knife blade or cutting edge 40. The tip of the looper is peculiarly formed to coact with a non-oscillatory needle, and the details of its construction are best illustrated in Figs. 4, 5, 6 and 7.

Figures 3, 4, 5, 6, 7:
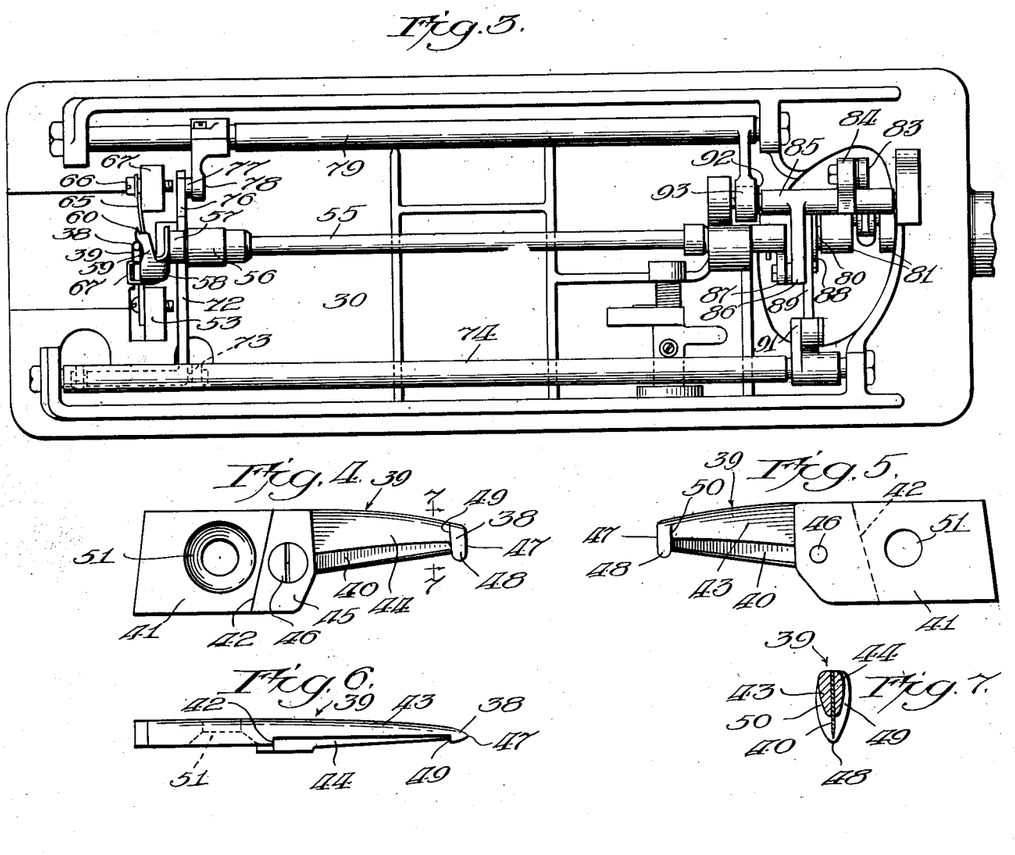
Fig. 3 is an inverted plan view of the base of the machine.
Figs. 4 and 5 are enlarged side views of the combined looper and cutter showing the opposite sides thereof.
Fig. 6 is an upper edge view of the looper and cutter.
Fig. 7 is a cross sectional view taken on line 7—7 of Fig. 4.
Figure 8:
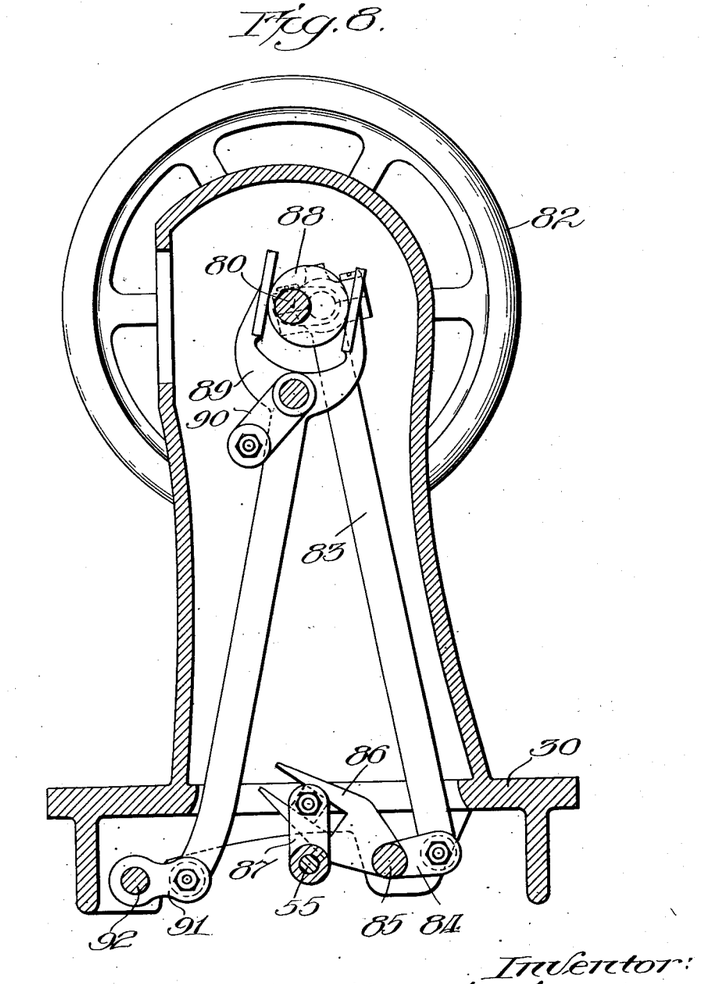
Fig. 8 is a cross sectional elevation through the rear portion of the machine.

The looper is constructed to provide a main section comprising a body 41 which is shouldered along the line 42, beyond which it assumes the configuration of a finger 43 which terminates in the tip 38. The finger 43 coacts with a thin clamping plate 44, likewise of finger formation, which serves to clamp the knife 40 in position.

The clamping finger plate terminates in a body plate 45, which fits against the shouldered portion of the body 41, and the parts are held in clamping relation by means of a screw 46, which permits the ready removal of the clamp for the purpose of replacement of the cutting blade.

The tip 38, which is integrally formed at the end of the finger 43, presents its extremity in the form of a vertically extending wedge 47 terminating in a rounded hook finger 48, which projects below the edge of the cutter and furnishes in effect a hook for the retention of the loop. The hook is broadened behind its wedge-shaped terminal edge to afford a shoulder 49 on the outer side, which extends through to the upper side of the looper at this point. The opposite side of the tip (Fig. 5) also affords a shoulder 50, which, however, terminates below the upper rounded edge of the finger 43.

The body 41 of the looper is provided with a screw hole 51 which receives a screw 52 for securing the looper as a whole to a fixed bracket 53 which depends from the table 30 or other portion of the frame of the machine.

Figure 12:
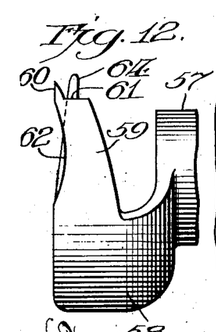
Fig. 12 is an enlarged detail, looking downwardly upon the oscillatory loop feeder.

Below the looper is located an oscillatory loop feeder 54 which is mounted upon a rock shaft 55 extending longitudinally below the base of the machine and journalled at its forward end through a journal bearing 56. The formation of the loop feeder is best shown in Fig. 12; it consists of a collar 57, from which extends a neck 58, which is radially and forwardly rounded and which terminates in an arcuate finger 59 which presents its curved edge outwardly.

Figure 10:
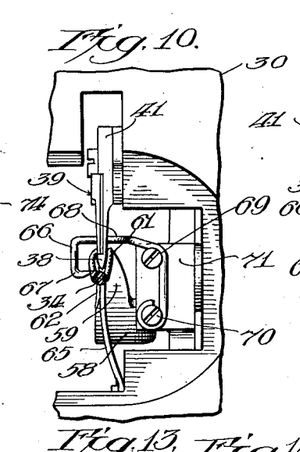
Figs. 10 and 11 are similar views showing the parts in progressive stages of adjustment.
Figures 13, 14, 15, 16:
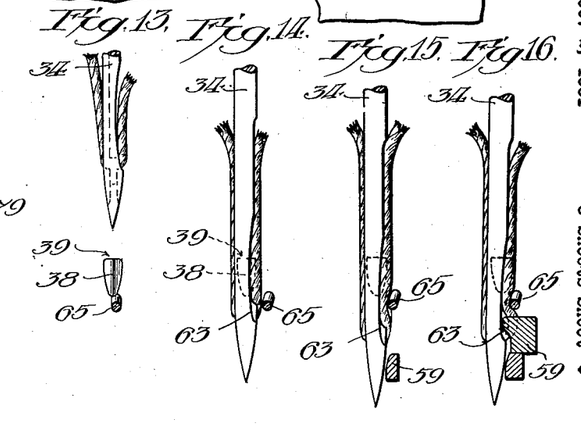
Figs. 13, 14, 15 and 16 are enlarged details showing the needle and the tip of the looper and associated mechanisms in progressive positions of adjustment.

The finger terminates at its forward upper corner in a tip 60 which springs forwardly from a shoulder 61, and the outer edge of the finger, immediately behind the tip, is scarfed or curvedly recessed at 62. The finger is so positioned that when it oscillates toward the needle, the tip 60 will register with a scarf 63 on the inner side of the needle and will there engage the inner turn of the thread carried by the needle immediately above the eye of the needle, as best shown in Fig. 16, which illustrates the finger 59 advancing to the needle. The thread thus engaged by the tip of the finger will be caught by the shoulder 61 of the finger and will thereby be prevented from slipping backwardly along the finger as the same is delivering the loop of thread over the tip of the looper. Fig. 10 shows the thread being carried upon the finger and shoulder 61 away from the needle and onto the tip of the looper.

In order to exactly position the tip of the needle in relation to the tip of the finger during the looping operation, the feeder is provided inwardly adjacent to the finger tip, with a guide finger 64, which presents a slightly oblique surface outwardly for the engagement of the tip of the needle. The guiding surface of the guide finger is accurately configured with relation to the obliquity of the needle tip to maintain a firm but not excessive pressure against the side of the needle tip as the tip is descending and as the feeder is concurrently oscillating, so as to ensure accurate register between the tip of the feeding finger and the scarfed portion of the needle as these two members come into coacting relation. Before the tip of the feeding finger is swung around to engage the needle, the latter is brought into coacting relation with, and outside of, the spring guide rod 65, the outer end of which is rigidly secured by a screw 66 to a bracket lug 54, corresponding in position to the bracket lug 53 but on the opposite side of the loop feeder. (See Fig. 1.)

The free end of the guide rod 65 normally occupies a position immediately adjacent to and slightly below the wedge-shaped edge of the tip of the looper (Figs. 10 and 13). As the needle descends past the tip of the looper, its point will pass just outside of the guide rod 65 and spring the rod backwardly (Figs.

14, 15 and 16), thus interposing the rear turn of the thread carried by the needle between the needle scarf 63 and the side of the guide rod. As the needle completes its descent, the tip 60 of the feeding finger will oscillate forwardly and engage the thread immediately below the guide rod 65 (Fig. 16), and carry the loop of thread beyond the free tip of the displaced guide rod, thereby releasing the thread from compression and permitting it to slip between the end of the guide rod and the opposed tip of the looper, so that the turn of the thread will be carried behind the looper and beyond the inner shoulder 50 of the looper.

The oscillating of the feeding finger thus has the effect of diverting the turn of the thread forming loop into oblique relation to the needle shank (Fig. 10), and it is necessary during this operation to closely engage the thread to insure its accurate delivery over the tip of the looper. The guide rod, by its contact with the thread during this operation, insures accurate delivery of the loop, since its only channel of escape from confinement is through the gap afforded between the tip of the guide rod and the tip of the looper as the guide rod is displaced by the contact of the needle.

Figure 9:
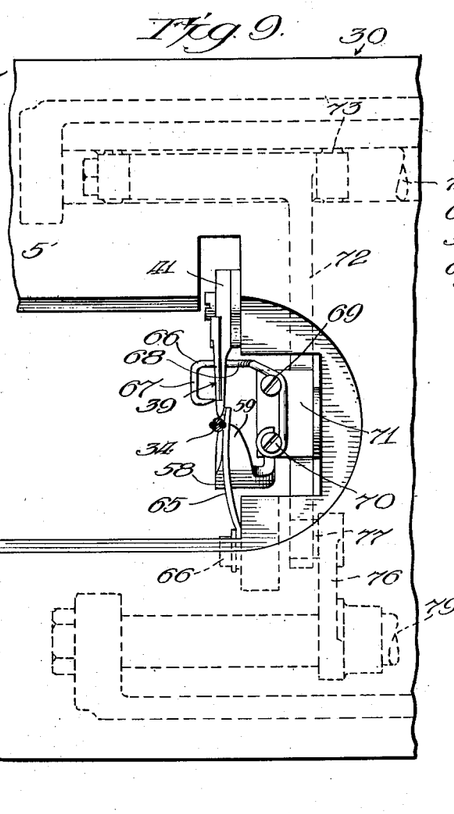
Fig. 9 is an enlarged sectional plan view, looking downwardly upon the looping and cutting mechanism.
Figure 11:
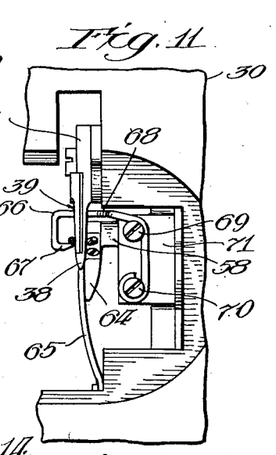

After the loop has been delivered from the tip of the looper and has been engaged by the shoulders 49 and 50, and by the hook shaped projection 48, it is held against displacement during the upward recession of the needle by the action of a retaining finger 66, the formation of which is best illustrated in Figs. 9, 10 and 11. This finger is formed of spring wire, with its tip 67 turned inwardly toward the looper and in position to engage the outer turn of the thread loop after it has been thrown over and onto the looper by the action of the feeding finger.

The shank of the retaining finger 66 is downwardly offset at the point 68 to clear the looper, and the rear end of the finger is carried around a screw 69 and secured by a screw 70 to a plate 71 which is mounted upon a rocking bar 72, the left end of which is pivoted to a crank arm 73 carried by a rock shaft 74. The opposite end of the rocking bar 72 is slotted at 76 to embrace a pin 77 carried by a rocking arm 78 on a rock shaft 79.

Figure 18:
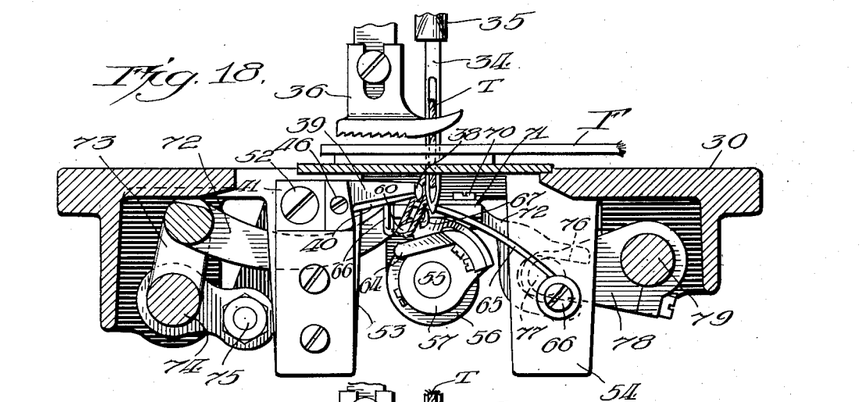
Figure 19:
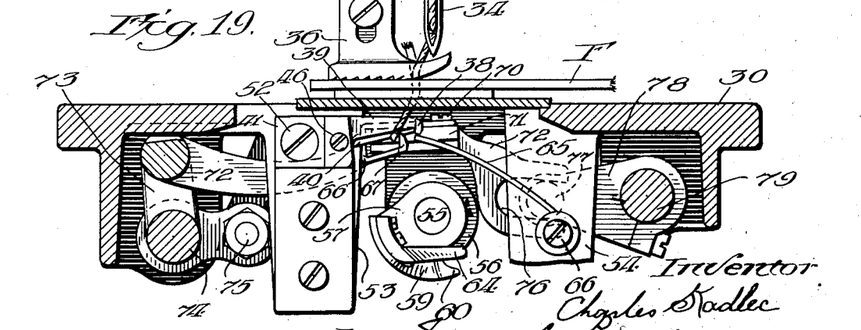
Figure 20:
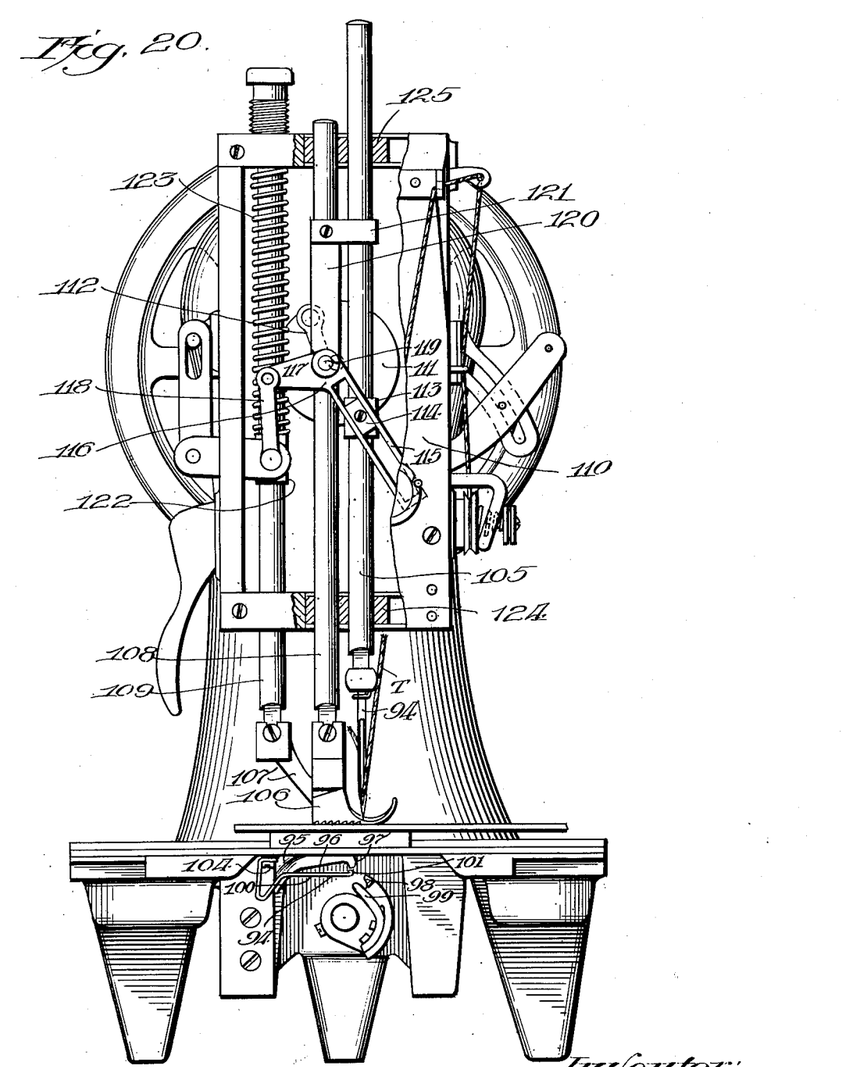
Fig. 20 is a front elevation of a modified construction of cutter and looper associated with the mechanism for operating an oscillatory needle.

The mounting for the retaining finger 66 is one which imparts a slight four-way feeding movement to the tip end of the retaining finger through the several positions shown in Figs. 17, 18 and 19, the movement being one which enables the tip of the finger to engage the thread loop on the forward reciprocation, as in Fig. 18, and to carry it back and away from the tip of the looper, as in Fig. 17, and retain it against displacement during the upward recession of the needle, as in Fig. 19.

The action of the retaining finger also serves to mechanically crowd back the loops along the cutting edge of the looper blade, so that after several loops have been delivered, and have been fed in processional form along the cutting edge, the foremost loop of the procession will be severed and released from the cutter as the fabric advances. The cutting is further facilitated by the obliquity of the edge of the cutting blade, so that, as the procession of loops is advanced, the tension against the knife edge will be increased until the cutting is ultimately effected.

The rock shaft 55 is actuated at the rear end of the machine from a main power shaft 80 provided with a crank 81 and carrying a pulley 82. The crank 81 actuates a pitman 83 which in turn connects with a crank arm 84 on a rock shaft 85, which carries a slotted arm 86 engaging a rock arm 87 on the shaft 55, so that the rotation of the main power shaft will be transformed into rocking movements of the desired amplitude for the actuation of the feeding finger.

The shaft 80 also carries an eccentric 88, which is embraced by a yoke 89 supported at its upper end by a pivoted link 90, and pivoted at its lower end to a rocking arm 91 on the shaft 74, to the forward end of which the rocking arm 73 is secured. This arrangement imparts a slight oscillatory movement to the parts which support the hooked retaining finger.

Rocking movement is imparted to the shaft 79 by an eccentric 92 on the shaft 85, which actuates an arm 93 on the shaft 79 (Fig. 3). This imparts a rocking movement to the arm 78 which engages the bifurcated end 76 of the rocking bar 72.

The presser foot 36 is suitably actuated in the usual manner to impart intermittent feeding movements to the fabric F in timed relation to the movements of the needle, so that the fabric will be moved forward during the interval while the needle is lifted, as in Fig. 19.

In Figs. 20 to 27 inclusive is shown a modified form of mechanism associated with an oscillatory needle 94. In this modification, the looper and the loop feeding finger may be identical with those previously described, although in the present instance, a looper 95 having a sharpened knife edge 96 is employed in lieu of the removable cutting blade.

The looper is provided with a hooked tip 97 which co-operates with a feeding finger 98 and a needle guide 99, similar to or identical with those previously described.

In lieu of the movable retaining finger 66, a fixed retaining finger 100 is employed, which is provided with an inwardly turned hook shaped tip 101, the end of which is preferably beveled and lies substantially in line with and slightly below the tip of the looper.

The shank of the retaining finger is downturned and reversely bent to afford an elbow 102, which merges into an outwardly extending arm 103 secured around a screw 104 near the front of the machine. The tip of the retaining finger is backwardly bent to a slight degree to permit the loops to slip past the point, which, however, serves to permit the loop to slip past the point and over the tip of the looper, but thereafter serves to prevent the loop from being withdrawn during the oscillatory recession of the feeding finger.

Figure 21:
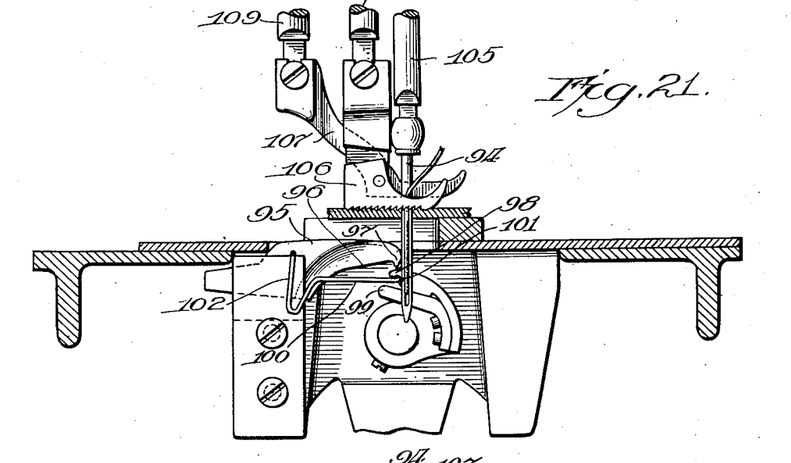
Figs. 21, 22 and 23 are front elevations of the mechanism in progressive positions of adjustment.

Fig. 21 shows the feeding finger in the act of carrying the loop of thread over the end of the looper and past the tip of the retaining finger.

Figure 22:
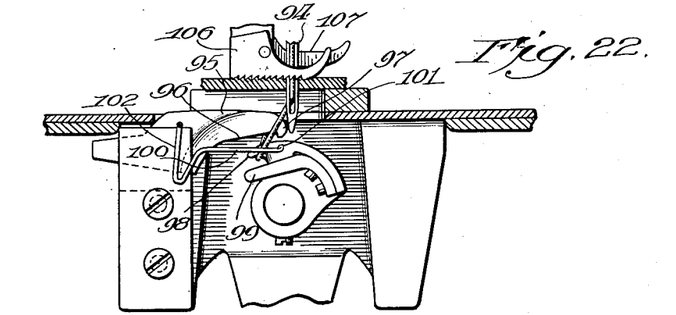
Figure 23:
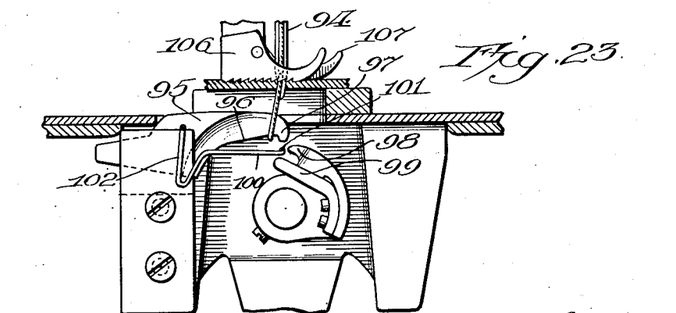
Figure 24:
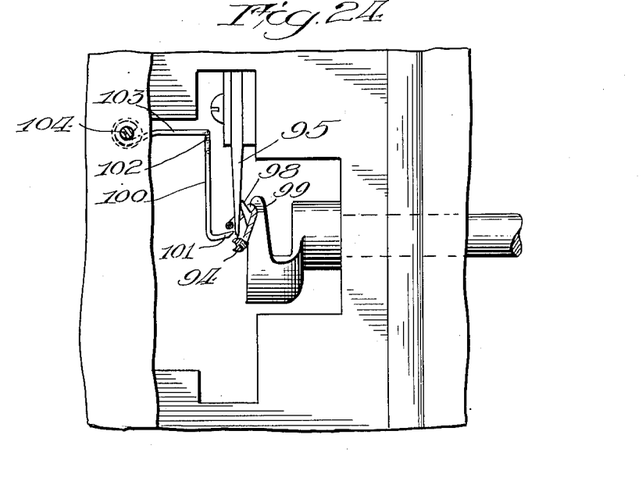
Fig. 24 is a plan view of the looper, the loop feeder, and the looper retainer.

Fig. 22 shows the loop carried well on to the looper and within the hook of the retaining finger; and Fig. 23 shows the feeding finger in its retracted position. The oscillatory movement of the feeding finger serves, on its advance movement, to draw out the thread through the needle into a loop of a length sufficient to clear the tip of the looper.

Figures 25, 26, 27:
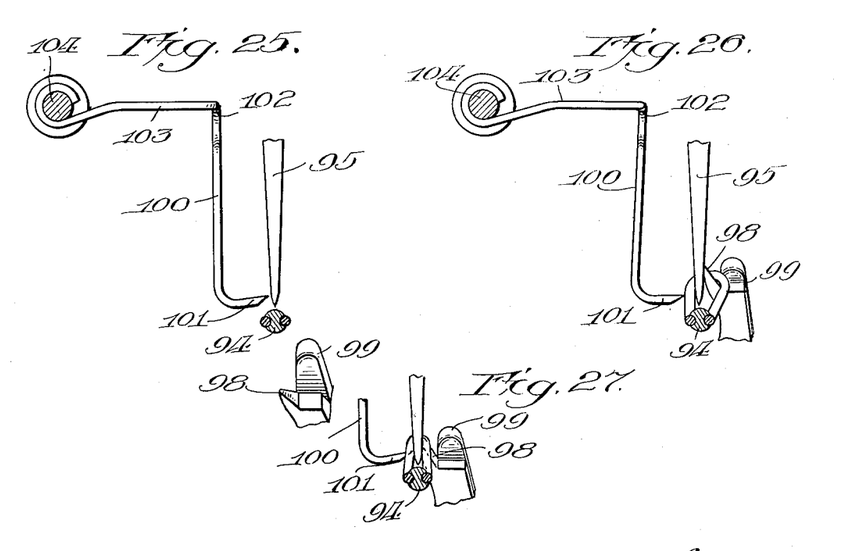
Figs. 25, 26 and 27 are details showing said mechanisms in various positions of adjustment.

Fig. 26 illustrates the slipping of the loop of thread past the tip of the retaining finger; and Fig. 27 shows how the finger springs inwardly to a slight degree after the passage of the loop.

The needle 94 is carried by an oscillatory reciprocating rod 105, and the needle coacts with a presser foot 106 and a presser plate 107 of standard construction.

The presser foot is carried by a rod 108, and the feeding plate by a rod 109, all of which are of standard construction in sewing machines of the type which employ an oscillating needle. However, a brief résumé of the mechanism for operating the rods 105, 108 and 109 will be given as these mechanisms are operated in a Singer sewing machine.

The three rods extend upwardly into a housing 110 which constitutes the end portion of a sewing machine, and motion is derived from a disk 111 mounted on the forward end of the power shaft of the machine. Through a suitable link 112, motion is derived from the rotating disk 111.

The rod 105 is provided with a collar 113, which is pivoted to a slide block 114 slidably mounted in a slotted arm 115 of a bell crank lever 116, the opposite arm 117 of which is connected to a swinging link 118.

The bell crank lever 116 is pivoted at 119 to a sleeve 120 on the rod 108, which is provided with a head 121, through which the rod 105 is slidably entered.

The lower end of the link 118 is pivoted to a collar 122 on the rod 109, and above the collar the rod is surrounded by a coil spring 123, the upper end of which bears against the upper end of the housing.

The rods 105 and 108 are reciprocally mounted through a slide block 124 in the lower end of the housing, which permits limited back and forth horizontal movements commensurate with the feeding back and forth movements imparted to the presser foot and the needle.

The upper ends of the rods 105 and 108 are reciprocally mounted through a slide block 125. This system of links, levers and connections is one which imparts an extended range of reciprocating movement to the needle, and a slight range of reciprocating movement to the presser foot, and also imparts to these two instrumentalities a back and forth movement in unison with the feeding of the fabric in conformity with the principle of feeding and needle operation embodied in Singer sewing machines of standard construction.

Operation

In the operation of the machine first described, the needle travels in a straight line reciprocation, and the fabric will remain stationary during the operation of the looping mechanism. As the needle descends, it will pass the tip of the looper and bring the inner turn of the thread into lateral contact with the outer side of the guide rod 65, which will force the free end of the guide rod slightly backward in preparation for the oscillatory advance of the feeding finger. The finger will engage the thread on the rear or inner side of the needle and carry it forward and downward, thereby pulling out a loop, as in Fig. 18, and as this loop is carried forward, its rear turn will slip past the end of the guide rod and behind the tip of the looper, while the outer turn of the same loop will remain on the near side of the spring guide rod. This presents the two turns of the loop on opposite sides of the looper, so that the feeding finger will readily carry the loop forward until the opposite turns thereof are engaged by the shoulders behind the tip of the looper, which will assist in preventing retraction of the loop with the recession of the feeding finger. Such retraction is further prevented by the operation of the retaining finger, which hooks over the impaled loop and draws it backwardly onto the looper as the feeding finger oscillates in the opposite direction.

It will be observed from Figs. 18 and 19 that the movements of the feeding finger and the retaining finger are timed to occur in opposition to one another so that there will be no possibility of escape of the loop as the feeding finger is drawn away. This arrangement of parts enables a stationary looper to co-operate with a non-oscillatory needle, since the conjoint action of these feeding and retaining instrumentalities serves to carry the loop well onto the looper during the lifting movement of the needle.

The arrangement is one which serves to afford accurate and positive guidance and control for the thread during and after its introduction onto the looper and until the forward advance of the fabric begins to draw the previously formed loop against the edge of the knife in preparation for the ultimate cutting of the loop as the fabric advances and In the form of construction employing the knife.

In the form of construction employing the oscillatory needle, the feeding movements of the fabric occur while the needle is pierced through the fabric on its downward stroke, so that these feeding movements are themselves utilized in part to carry the thread toward and onto the tip of the looper, such feeding movements being supplemented by the positive action of the feeding finger, which serves to carry the loop well over the tip of the looper irrespective of the range of oscillation imparted to the needle. In these circumstances, it is not necessary to provide a positively actuated retaining finger for carrying the loops along the looper, so that in lieu thereof a stationary spring finger is provided, which serves to insure disengagement of the loops from the feeding finger as the same reciprocates away from the tip of the looper.

The device is one which possesses the distinct merit of being adapted for use, with but slight modification, on either type of sewing machine, although it possesses especial merit in connection with sewing machines of the non-oscillatory type, in which the thread, during the looping operation, must be guided and controlled with great accuracy and precision by reason of the lack of any movement in the needle itself which may be availed of to assist in the looping operation. The device in either form of construction is one which may be readily fitted to any type of sewing machine without the necessity for substantial revision or re-construction in the general structure of the machine.

Although the invention has been described with particularity as to detail, it is not the intention to limit the same to the precise details shown, since modifications thereof may be made without departing from the spirit of the invention.

I claim:

1. In tufting mechanism of the class described, the combination of a reciprocating needle, a bill-shaped looper presenting its tip in a direction opposite to the line of advance of the fabric and in closely spaced relation to the needle when lowered and provided with a downwardly presented cutting blade, a feeding finger mounted for movement laterally past the tip of the needle when lowered, to engage a turn of thread carried by the needle and carry the same over the tip of the looper, and means for actuating the parts in timed relationship to one another.

2. In tufting mechanism of the class described, the combination of a reciprocating needle, a bill-shaped looper presenting its tip in a direction opposite to the line of advance of the fabric and in closely spaced relation to the needle when lowered and provided with a downwardly presented cutting blade, a feeding finger mounted for movement laterally past the tip of the needle when lowered, to engage a turn of thread carried by the needle and carry the same over the tip of the looper, and means for actuating the parts in timed relationship to one another, and retaining means for engaging the loop of thread delivered to the looper and preventing withdrawal thereof by the backward movement of the feeding finger.

3. In tufting mechanism of the class described, the combination of a reciprocating needle, a bill-shaped looper presenting its tip in a direction opposite to the line of advance of the fabric and in closely spaced relation to the needle when lowered and provided with a downwardly presented cutting blade, a feeding finger mounted for movement laterally past the tip of the needle when lowered, to engage a turn of thread carried by the needle and carry the same over the tip of the looper, and means for actuating the parts in timed relationship to one another, retaining means for engaging the loop of thread delivered to the looper and preventing withdrawal thereof by the backward movement of the feeding finger, and means for actuating the retaining means in opposition to the movements of the feeding finger.

4. In tufting mechanism of the class described, the combination of a reciprocating needle, a bill-shaped looper presenting its tip in closely spaced relation to the needle when lowered, a feeding finger mounted for movement past the side of the needle when lowered, to engage a turn of thread carried by the needle and carry the same over the tip of the looper, and means for operating the needle and feeding finger in timed relationship to one another.

5. In tufting mechanism of the class described, the combination of a reciprocating needle, a bill-shaped looper presenting its tip in closely spaced relation to the needle when lowered, a feeding finger mounted for movement past the side of the needle when lowered, to engage a turn of thread carried by the needle and carry the same over the tip of the looper, means for operating the needle and feeding finger in timed relationship to one another, and means for severing the loops delivered to the looper.

6. In tufting mechanism of the class described, the combination of a reciprocating needle, a bill-shaped looper presenting its tip in closely spaced relation to the needle when lowered, a feeding finger mounted for movement past the side of the needle when lowered, to engage a turn of thread carried by the needle and carry the same over the tip of the looper, and means for operating the needle and feeding finger in timed relationship to one another, means for severing the loops delivered to the looper, and means for insuring retention of the loops delivered by the feeding finger to the looper during the return movement of the feeding finger.

7. In tufting mechanism of the class described, the combination of a reciprocating needle, a bill-shaped looper presenting its tip in closely spaced relation to the needle when lowered, a feeding finger mounted for movement past the side of the needle when lowered, to engage a turn of thread carried by the needle and carry the same over the tip of the looper, and means for operating the needle and feeding finger in timed relationship to one another, means for severing the loops delivered to the looper, and means for insuring retention of the loops delivered by the feeding finger to the looper during the return movement of the feeding finger, said means being in the form of an inturned finger positioned to permit the thread to slip by its tip during the introduction of a loop and to prevent escape of the loop thereafter.

8. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper to engage a turn of thread carried by the needle and form a loop thereof and deliver the loop over the tip of the looper.

9. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper to engage a turn of thread carried by the needle and form a loop thereof and deliver the loop over the tip of the looper, the looper being provided with a hooked portion adjacent to its tip to engage the loop.

10. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper to engage a turn of thread carried by the needle and form a loop thereof and deliver the loop over the tip of the looper, and retaining means for engaging the loop when delivered to the looper and preventing its escape therefrom.

11. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper to engage a turn of thread carried by the needle and form a loop thereof and deliver the loop over the tip of the looper, the looper being provided with a hooked portion adjacent to its tip to engage the loop, and retaining means for engaging the loop when delivered to the looper and preventing its escape therefrom.

12. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper to engage a turn of thread carried by the needle and form a loop thereof and deliver the loop over the tip of the looper, and retaining means for engaging the loop when delivered to the looper and preventing its escape therefrom, said retaining means being movable toward and from the tip of the looper in opposition to the movements of the feeding finger.

13. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper to engage a turn of thread carried by the needle and form a loop thereof and deliver the loop over the tip of the looper, the looper being provided with a hooked portion adjacent to its tip to engage the loop, and retaining means for engaging the loop when delivered to the looper and preventing its escape therefrom, said retaining means being movable toward and from the tip of the looper in opposition to the movements of the feeding finger.

14. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper to engage a turn of thread carried by the needle and form a loop thereof and deliver the loop over the tip of the looper, and a guide member mounted to oscillate with the feeding finger and configured to engage the side of the needle during the looping operation, to accurately position the needle with respect to the tip of the looper and the feeding finger.

15. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper, to engage a turn of thread carried by the needle and form a loop thereof and deliver the loop over the tip of the looper, the looper being provided with a hooked portion adjacent to its tip to engage the loop, and a guide member mounted to oscillate with the feeding finger and configured to engage the side of the needle during the looping operation, to accurately position the needle with respect to the tip of the looper and the feeding finger.

16. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper, to engage a turn of thread carried by the needle and form a loop thereof and deliver the loop over the tip of the looper, and retaining means for engaging the loop when delivered to the looper and preventing its escape therefrom, and a guide member mounted to oscillate with the feeding finger and configured to engage the side of the needle during the looping operation, to accurately position the needle with respect to the tip of the looper and the feeding finger.

17. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper, to engage a turn of thread carried by the needle and form a loop thereof and deliver the loop over the tip of the looper, the looper being provided with a hooked portion adjacent to its tip to engage the loop, and retaining means for engaging the loop when delivered to the looper and preventing its escape therefrom, and a guide member mounted to oscillate with the feeding finger and configured to engage the side of the needle during the looping operation, to accurately position the nedle with respect to the tip of the looper and the feeding finger.

18. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper, to engage a turn of thread carried by the needle and form a loop thereof and deliver the loop over the tip of the looper, and retaining means for engaging the loop when delivered to the looper and preventing its escape therefrom, said retaining means being movable toward and from the tip of the looper in opposition to the movements of the feeding finger, and a guide member mounted to oscillate with the feeding finger and configured to engage the side of the needle during the looping operation, to accurately position the needle with respect to the tip of the looper and the feeding finger.

19. In tufting mechanism of the class described, the combination of a reciprocating needle, a fixed looper mounted to present its free tip in close proximity to the needle when lowered, a cutting blade carried by the looper and presenting its edge downwardly, a feeding finger mounted to oscillate past the side of the needle and toward and beyond the tip of the looper, to engage a turn of thread carried by the needle and form a loop thereof and deliver the loop over the tip of the looper, the looper being provided with a hooked portion adjacent to its tip to engage the loop, and retaining means for engaging the loop when delivered to the looper and preventing its escape therefrom, said retaining means being movable toward and from the tip of the looper in opposition to the movements of the feeding finger, and a guide member mounted to oscillate with the feeding finger and configured to engage the side of the needle during the looping operation, to accurately position the needle with respect to the tip of the looper and the feeding finger.

20. In tufting mechanism of the class described, the combination of a reciprocating needle, a bill-shaped looper presenting its tip in close proximity to the needle when lowered, a feeding finger mounted to move past the side of the needle and toward and beyond the tip of the looper, to engage a turn of thread carried by the needle and form therefrom a loop and carry the loop onto the tip of the looper, and a guide rod having its free end closely adjacent to the tip end of the looper and adapted to bear laterally against the thread carried by the needle and guide the same during the formation of the loop and the delivery thereof by the feeding finger to the looper, and positioned to permit the inner turn of the loop under formation to escape between the tip of the guide rod and the tip of the looper and to retain the outer turn of the loop against escape, thereby insuring the delivery of the respective turns of the loop onto opposite sides of the looper, and means for actuating the needle and the feeding finger in timed relationship to one another.

21. In tufting mechanism of the class described, the combination of a reciprocating needle, a bill-shaped looper presenting its tip in close proximity to the needle when lowered, a feeding finger mounted to move past the side of the needle and toward and beyond the tip of the looper, to engage a turn of thread carried by the needle and form therefrom a loop and carry the loop onto the tip of the looper, and a guide rod having its free end closely adjacent to the tip end of the looper and adapted to bear laterally against the thread carried by the needle and guide the same during the formation of the loop and the delivery thereof by the feeding finger to the looper, and positioned to permit the inner turn of the loop under formation to escape between the tip of the guide rod and the tip of the looper and to retain the outer turn of the loop against escape, thereby insuring the delivery of the respective turns of the loop onto opposite sides of the looper, means for actuating the needle and the feeding finger in timed relationship to one another, and means for ultimately severing the loops and releasing them from the looper.

22. In tufting mechanism of the class described, the combination of a reciprocating needle, a bill-shaped looper presenting its tip in close proximity to the needle when lowered, a feeding finger mounted to move past the side of the needle and toward and beyond the tip of the looper, to engage a turn of thread carried by the needle and form therefrom a loop and carry the loop onto the tip of the looper, and a guide rod having its free end closely adjacent to the tip end of the looper and adapted to bear laterally against the thread carried by the needle and guide the same during the formation of the loop and the delivery thereof by the feeding finger to the looper, and positioned to permit the inner turn of the loop under formation to escape between the tip of the guide rod and the tip of the looper and to retain the outer turn of the loop against escape, thereby insuring the delivery of the respective turns of the loop onto opposite sides of the looper, and means for actuating the needle and the feeding finger in timed relationship to one another, and a knife edge carried by the looper and presenting its cutting edge downwardly to insure the ultimate severing and release of the loops from the looper.

23. In tufting mechanism of the class described, the combination of a reciprocating needle, a bill-shaped looper presenting its tip in close proximity to the needle when lowered, a feeding finger mounted to move past the side of the needle and toward and beyond the tip of the looper, to engage a turn of thread carried by the needle and form therefrom a loop and carry the loop onto the tip of the looper, and a guide rod having its free end closely adjacent to the tip end of the looper and adapted to bear laterally against the thread carried by the needle and guide the same during the formation of the loop and the delivery thereof by the feeding finger to the looper, and positioned to permit the inner turn of the loop under formation to escape between the tip of the guide rod and the tip of the looper and to retain the outer turn of the loop against escape, thereby insuring the delivery of the respective turns of the loop onto opposite sides of the looper, and means for actuating the needle and the feeding finger in timed relationship to one another, and a retaining finger movable in opposition to the movements of the feeding finger and adapted to permit delivery of loops onto the looper and thereafter prevent escape therefrom during the return movement of the feeding finger.

24. In tufting mechanism of the class described, the combination of a reciprocating needle, a bill-shaped looper presenting its tip in close proximity to the needle when lowered, a feeding finger mounted to move past the side of the needle and toward and beyond the tip of the looper, to engage a turn of thread carried by the needle and form therefrom a loop and carry the loop onto the tip of the looper, and a guide rod having its free end closely adjacent to the tip end of the looper and adapted to bear laterally against the thread carried by the needle and guide the same during the formation of the loop and the delivery thereof by the feeding finger to the looper, and positioned to permit the inner turn of the loop under formation to escape between the tip of the guide rod and the tip of the looper and to retain the outer turn of the loop against escape, thereby insuring the delivery of the respective turns of the loop onto opposite sides of the looper, means for actuating the needle and the feeding finger in timed relationship to one another, and means for ultimately severing the loops and releasing them from the looper, and a retaining finger movable in opposition to the movements of the feeding finger and adapted to permit delivery of loops onto the looper and thereafter prevent escape therefrom during the return movement of the feeding finger.

25. In tufting mechanism of the class described, the combination of a reciprocating needle, a bill-shaped looper presenting its tip in close proximity to the needle when lowered, a feeding finger mounted to move past the side of the needle and toward and beyond the tip of the looper, to engage a turn of thread carried by the needle and form therefrom a loop and carry the loop onto the tip of the looper, and a guide rod having its free end closely adjacent to the tip end of the looper and adapted to bear laterally against the thread carried by the needle and guide the same during the formation of the loop and the delivery thereof by the feeding finger to the looper, and positioned to permit the inner turn of the loop under formation to escape between the tip of the guide rod and the tip of the looper and to retain the outer turn of the loop against escape, thereby insuring the delivery of the respective turns of the loop onto opposite sides of the looper, means for actuating the needle and the feeding finger in timed relationship to one another, a knife edge carried by the looper and presenting its cutting edge downwardly to insure the ultimate severing and release of the loops from the looper, and a retaining finger movable in opposition to the movements of the feeding finger and adapted to permit delivery of loops onto the looper and thereafter prevent escape therefrom during the return movement of the feeding finger.

26. In tufting mechanism of the class described, the combination of a reciprocating needle, a stationary looper provided along its lower edge with a cutting edge and terminating in a downturned tip furnishing a hook, and a feeding finger movable toward and from the tip of the looper and laterally past the needle when lowered, to engage a turn of thread carried by the needle and form a loop therefrom and deliver the loop over the tip of the looper.

27. In tufting mechanism of the class described, the combination of a reciprocating needle, a stationary looper provided along its lower edge with a cutting edge and terminating in a downturned tip furnishing a hook, and extended laterally beyond the body of the looper to furnish shoulders in conjunction therewith, and a feeding finger movable toward and from the tip of the looper and laterally past the needle when lowered, to engage a turn of thread carried by the needle and form a loop therefrom and deliver the loop over the shouldered tip of the looper.

28. In tufting mechanism of the class described, the combination of a reciprocating needle, a stationary looper provided along its lower edge with a cutting edge and terminating in a downturned tip furnishing a hook, and a feeding finger movable toward and from the tip of the looper and laterally past the needle when lowered, to engage a turn of thread carried by the needle and form a loop therefrom and deliver the loop over the tip of the looper, and means for actuating the feeding finger in timed relation to the needle.

29. In tufting mechanism of the class described, the combination of a reciprocating needle, a stationary looper provided along its lower edge with a cutting edge and terminating in a downturned tip furnishing a hook, and extended laterally beyond the body of the looper to furnish shoulders in conjunction therewith, and a feeding finger movable toward and from the tip of the looper and laterally past the needle when lowered, to engage a turn of thread carried by the needle and form a loop therefrom and deliver the loop over the shouldered tip of the looper, and means for actuating the feeding finger in timed relation to the needle.

30. In tufting mechanism of the class described, the combination of a reciprocating needle, a stationary looper provided along its lower edge with a cutting edge and terminating in a downturned tip furnishing a hook, and a feeding finger movable toward and from the tip of the looper and laterally past the needle when lowered, to engage a turn of thread carried by the needle and form a loop therefrom and deliver the loop over the tip of the looper, and means for actuating the feeding finger in timed relation to the needle, and a guide rod of flexible material secured at its outer end and having its free inner end closely adjacent to the tip of the looper and in position to bear against the inner turn of the loop being formed by the feeding finger, and permit said inner turn to slip through the space intermediate the tip end of the guide rod and the tip end of the looper, and to retain the outer turn of said loop against escape through said space to insure delivery of said turns on opposite sides of the looper 31. In tufting mechanism of the class described, the combination of a reciprocating needle, a stationary looper provided along its lower edge with a cutting edge and terminating in a downturned tip furnishing a hook, and extended laterally beyond the body of the looper to furnish shoulders in conjunction therewith, and a feeding finger movable toward and from the tip of the looper and laterally past the needle when lowered, to engage a turn of thread carried by the needle and form a loop therefrom and deliver the loop over the shouldered tip of the looper, and means for actuating the feeding finger in timed relation to the needle, and a guide rod of flexible material secured at its outer end and having its free inner end closely adjacent to the tip of the looper and in position to bear against the inner turn of the loop being formed by the feeding finger, and permit said inner turn to slip through the space intermediate the tip end of the guide rod and the tip end of the looper, and to retain the outer turn of said loop against escape through said space to insure delivery of said turns on opposite sides of the looper.

CHARLES KADLEC.